United States Patent [19]

Jackson et al.

[11] Patent Number: 5,302,444

[45] Date of Patent: Apr. 12, 1994

[54] MICROPOROUS THERMAL INSULATION MATERIAL

[75] Inventors: James D. J. Jackson; Tony M. Matthews, both of Kidderminster; Darren J. Glover, Stourport-on-Severn, all of United Kingdom

[73] Assignee: Zortech International Limited, Worcestershire, United Kingdom

[21] Appl. No.: 13,334

[22] Filed: Feb. 4, 1993

[30] Foreign Application Priority Data

Feb. 7, 1992 [GB] United Kingdom ............... 9202608

[51] Int. Cl.⁵ .................................................. B32B 9/00
[52] U.S. Cl. .................................. 428/228; 428/240; 428/241; 428/281; 428/285; 252/518; 252/519; 252/520; 252/521; 501/11
[58] Field of Search ............... 428/913, 228, 240-241, 428/281, 285; 252/518-521; 501/11

[56] References Cited

U.S. PATENT DOCUMENTS

| | | | |
|---|---|---|---|
| 2,726,977 | 4/1952 | See et al. | 428/239 |
| 2,808,338 | 10/1957 | Bruno et al. | 106/69 |
| 3,055,831 | 9/1962 | Barnett et al. | 252/62 |
| 3,118,807 | 1/1964 | Holcomb | 428/281 |
| 4,066,466 | 1/1978 | Neeley, Jr. | 106/50 |
| 4,212,925 | 7/1980 | Kratel et al. | 428/447 |
| 4,221,672 | 9/1980 | McWilliam | 252/62 |
| 4,255,483 | 3/1981 | Byrd et al. | 428/245 |
| 4,308,308 | 12/1981 | Sachoe | 428/241 |
| 4,310,585 | 1/1982 | Shannon | 428/219 |
| 4,399,175 | 8/1983 | Kummermehr et al. | 428/76 |
| 4,636,416 | 1/1987 | Kratel et al. | 428/76 |
| 4,680,220 | 6/1987 | Johnson | 428/281 |
| 5,110,674 | 5/1992 | Grube et al. | 428/285 |

FOREIGN PATENT DOCUMENTS

| | | |
|---|---|---|
| 0002502 | 12/1978 | European Pat. Off. . |
| 0022581 | 7/1980 | European Pat. Off. . |
| 0031166 | 12/1980 | European Pat. Off. . |
| WO9204301 | 3/1992 | PCT Int'l Appl. . |
| 1512766 | 6/1978 | United Kingdom . |
| 1531287 | 11/1978 | United Kingdom . |
| 2192279 | 8/1987 | United Kingdom . |

OTHER PUBLICATIONS

PCT patent Publication No. WO 83/03796 (Fell et al.).

*Primary Examiner*—Patrick J. Ryan
*Assistant Examiner*—Abraham Bahta
*Attorney, Agent, or Firm*—Ira S. Dorman

[57] ABSTRACT

A microporous thermal insulation material is formed from an intimate mixture of a dry particulate microporous material and reinforcing glass filaments. The glass constituting the glass filaments contains not more than 1 per cent by weight $Na_2O$ and preferably has the following composition:

| | |
|---|---|
| $SiO_2$ | 50-100 percent by weight |
| $Al_2O_3$ | up to 25 percent by weight |
| $B_2O_3$ | up to 8 percent by weight |
| $MgO$ | up to 10 percent by weight |
| $CaO$ | up to 21 percent by weight |
| $Na_2O$ | up to 1 percent by weight |
| $K_2O$ | up to 2 percent by weight |
| $Fe_2O_3$ | up to 1 percent by weight |
| $F_2$ | up to 1 percent by weight. |

22 Claims, 3 Drawing Sheets

MICROPOROUS THERMAL INSULATION MATERIAL

The present invention relates to microporous thermal insulation material and more particularly relates to microporous thermal insulation material containing glass filament reinforcement.

BACKGROUND OF THE INVENTION

The term 'microporous' is used herein to identify porous or cellular materials in which the ultimate size of the cells or voids is less than the mean free path of an air molecule at NTP, i.e. of the order of 100 nm or smaller. A material which is microporous in this sense will exhibit very low transfer of heat by air conduction (that is collisions between air molecules). Such microporous materials include aerogel, which is a gel in which the liquid phase has been replaced by a gaseous phase in such a way as to avoid the shrinkage which would occur if the gel were dried directly from a liquid. A substantially identical structure can be obtained by controlled precipitation from solution, the temperature and pH being controlled during precipitation to obtain an open lattice precipitate. Other equivalent open lattice structures include pyrogenic (fumed) and electrothermal types in which a substantial proportion of the particles have an ultimate particle size less than 100 nm. Any of these materials, based for example on silica, alumina or other metal oxides, may be used to prepare a composition which is microporous as defined above.

DESCRIPTION OF THE PRIOR ART

Microporous thermal insulation is described, for example, in U.S. Pat. No. 2,808,338 as comprising a reinforcing skeleton of fine staple reinforcing filaments which may be either organic or inorganic, a substantial amount, and preferably at least 45 per cent by weight, of a particulate filler material having a porous or fibrillate structure such as silica aerogel and, preferably, a substantial amount of finely divided opacifier materials. Suitable reinforcing filaments are said to include various types of asbestos filaments of reinforcing grade, cleaned mineral filaments, fine diameter glass filaments, preferably pre-treated, as with acid, to roughen the surface or otherwise to improve the surface adhesion characteristics, and organic filaments. A similar range of reinforcing filaments is disclosed in U.S. Pat. No. 3,055,831.

U.S. Pat. No. 4,212,925 describes an insulation material that is microporous in that it contains pyrogenic silica, an opacifier and an inorganic reinforcing filament. The inorganic reinforcing filament may be glass wool, rock wool, slag wool or ceramic filaments such as those which are obtained by melting aluminium oxide and silicon dioxide. U.S. Pat. No. 4,399,175 describes a similar microporous thermal insulation material which may contain reinforcing filaments such as aluminium silicate filaments, quartz or glass filaments, or ceramic filaments.

U.S. Pat. No. 4,221,672 describes the use of glass filaments in some detail. According to this reference it is conventional to employ aluminosilicate reinforcing filaments, but that the use of alumina filaments increases the tolerance of the microporous thermal insulation material to heat. On the other hand, glass filaments or mineral wool filaments resulted in high shrinkage occurring at lower temperatures, of the order of 700° C.

The prior art shows that although the use of glass reinforcing filaments as such has been proposed, the maximum temperature of use of microporous thermal insulation material containing such filaments is limited to some 700° C. due to excessive shrinkage of the insulation material at such temperatures.

OBJECT OF THE INVENTION

It is an object of the present invention to provide a microporous thermal insulation material containing glass filament reinforcement which has a maximum temperature of use in excess of 700° C.

SUMMARY OF THE INVENTION

According to the present invention there is provided a microporous thermal insulation material comprising an intimate mixture of a dry particulate microporous material and reinforcing glass filaments, wherein the glass constituting the glass filaments contains not more than 1 per cent by weight $Na_2O$.

Such glass filaments are available commercially as E-glass filaments.

The glass may have the following composition:

| | |
|---|---|
| $SiO_2$ | 50-100 percent by weight |
| $Al_2O_3$ | up to 25 percent by weight |
| $B_2O_3$ | up to 8 percent by weight |
| $MgO$ | up to 10 percent by weight |
| $CaO$ | up to 21 percent by weight |
| $Na_2O$ | up to 1 percent by weight |
| $K_2O$ | up to 2 percent by weight |
| $Fe_2O_3$ | up to 1 percent by weight |
| $F_2$ | up to 1 percent by weight. |

The glass may have substantially the following composition:

| | |
|---|---|
| $SiO_2$ | 54 to 55 percent by weight |
| $Al_2O_3$ | 14 to 15 percent by weight |
| $B_2O_3$ | 7 to 8 percent by weight |
| $MgO$ | 0.3 to 3 percent by weight |
| $CaO$ | 18 to 21 percent by weight |
| $Na_2O$ | up to 0.6 percent by weight |
| $K_2O$ | up to 0.2 percent by weight |
| $Fe_2O_3$ | 0.2 to 0.4 percent by weight |
| $F_2$ | up to 1 percent by weight. |

Alternatively, the glass may have substantially the following composition:

| | |
|---|---|
| $SiO_2$ | 60 percent by weight |
| $Al_2O_3$ | 25 percent by weight |
| $MgO$ | 6 percent by weight |
| $CaO$ | 9 percent by weight |

The glass filaments may be chopped from continuous glass filaments. Such filaments are readily available from a number of manufacturers. Chopped strand glass is made by melting a suitable glass formulation in a tank from which it flows through small diameter bushings and is then drawn into continuous filaments, for example 5 to 24 microns diameter, and these are dressed with an organic size and gathered to form strands. These strands are then chopped to discrete lengths. In contrast to other mineral filaments, chopped strand glass is substantially free from any non-fibrous material such as shot and is of substantially uniform diameter.

The glass filaments may have a length from 4 to 50 mm, and preferably may have a length from 6 to 25 mm.

The glass filaments may have a diameter in the range from 3 to 20 microns, and preferably may have a diameter in the range from 6 to 15 microns.

The microporous thermal insulation material may contain from 1 to 20 per cent by weight of glass filaments, and preferably may contain from 3 to 15 per cent by weight of glass filaments.

For a better understanding of the present invention and to show more clearly how it may be carried into effect reference will now be made, by way of example, to the accompanying drawings in which:

Figure 1:
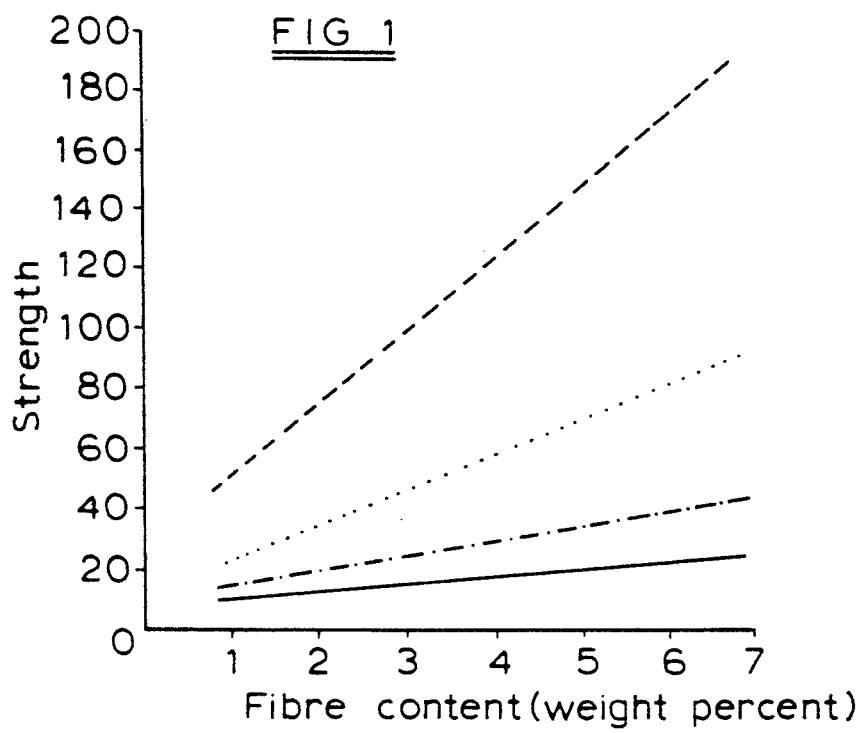
FIG. 1 is a graph illustrating the variation of the flexural strength of microporous thermal insulation material with filament content for different filament types.

The invention will be explained with reference to the following Examples.

DESCRIPTION OF COMPARISON EXAMPLES

Example 1 (Comparative)

A block of microporous thermal insulation material was made by mixing together in a blade-type mixer a mixture of 60 per cent by weight of pyrogenic silica available from Cabot Corporation under Trade Mark CABOSIL M5, the silica having a nominal specific surface area of 250 m²/g as measured by the B.E.T method, 33.3 per cent by weight of a particulate opacifier in the form of titanium dioxide and 6.7 per cent by weight of aluminosilicate (or ceramic) filaments available from The Carborundum Company Limited under the Trade Mark FIBERFRAX. The materials were mixed together in order to obtain a homogeneous mixture.

The mixture was compacted into a cylindrical block having a diameter of 110 mm and a thickness of 25 mm, the block having a density of 320 kg/m³ and was heated at a temperature of 800° C. for a period of 24 hours. When the block had cooled it was established that the block had shrunk by 0.35 per cent in the diametral direction and 0.80 per cent in the axial direction. Such a material is fully suitable for use as a thermal insulation material at a temperature of 800° C.

Example 2 (Comparative)

A block of microporous thermal insulation material was made by mixing together a mixture of 60 per cent by weight of pyrogenic silica available from Cabot Corporation under Trade Mark CABOSIL M5, 33.3 per cent by weight of a particulate opacifier in the form of titanium dioxide and 6.7 per cent by weight of chopped glass strand available from Glaswerk Schüller GmbH under the Trade Mark MICROLITH, the filaments having a nominal length of 25 mm and a nominal diameter of 12 microns, the glass having the following composition:

| | |
|---|---|
| SiO$_2$ | 65 percent by weight |
| Al$_2$O$_3$ | 4 percent by weight |
| B$_2$O$_3$ | 5 percent by weight |
| MgO | 3 percent by weight |
| CaO | 14 percent by weight |
| Na$_2$O | 8.5 percent by weight |
| Fe$_2$O$_3$ | 0.3 percent by weight | together with incidental ingredients and impurities. The mixture was compacted into a cylindrical block having substantially the same dimensions as in Example 1, the block having a density of 319 kg/m³, and was heated at a temperature of 800° C. for a period of 24 hours. When the block had cooled it was established that the block had shrunk by 39.5 per cent in the diametral direction and 18.5 per cent in the axial direction. Such a material is clearly unsuitable for use as a thermal insulation material at a temperature of 800° C.

DESCRIPTION OF PREFERRED EXAMPLES

Example 3

A block of microporous thermal insulation material was made by mixing together, in the same manner as Example 2, a mixture of 60 per cent by weight of pyrogenic silica available from Cabot Corporation under Trade Mark CABOSIL M5, 33.3 per cent by weight of a particulate opacifier in the form of titanium dioxide and 6.7 per cent by weight of chopped E-glass strand available from Owens Corning Fiberglas Corporation under the Trade Mark FIBERGLAS, the filaments having a nominal length of 25 mm and a nominal diameter of 13 microns, the glass having substantially the following composition:

| | |
|---|---|
| SiO$_2$ | 54 to 55 percent by weight |
| Al$_2$O$_3$ | 14 to 15 percent by weight |
| B$_2$O$_3$ | 7 to 8 percent by weight |
| MgO | 0.3 to 3 percent by weight |
| CaO | 18 to 21 percent by weight |
| Na$_2$O | up to 0.6 percent by weight |
| K$_2$O | up to 0.2 percent by weight |
| Fe$_2$O$_3$ | 0.2 to 0.4 percent by weight |
| F$_2$ | up to 1 percent by weight. | together with incidental ingredients and impurities. The mixture was compacted into a cylindrical block having similar dimensions to those in Example 1, the block having a density of 320 kg/m³, and was heated at a temperature of 800° C. for a period of 24 hours. When the block had cooled it was established that the block had shrunk by 1.54 per cent in the diametral direction and 1.51 per cent in the axial direction. Such a material is generally suitable for use as a thermal insulation material at a hot face temperature of 800° C.

Example 4

Example 3 was repeated but substituting in the block of microporous thermal insulation material chopped E-glass strand available from Vetrotex International under the Trade Mark VETROTEX EB107DC-/5EC14300 12 mm (p312 Sp219) in place of the chopped E-glass strand from Owens Corning Fiberglas Corporation, the filaments having a nominal length of 12 mm and a nominal diameter of 14 microns.

The mixture was compacted into a cylindrical block having similar dimensions to those in Example 1, the block having a density of 313 kg/m$^3$, and was heated at a temperature of 800° C. for a period of 24 hours. When the block had cooled it was established that the block had shrunk by 1.74 per cent in the diametral direction and 1.20 per cent in the axial direction. Such a material is generally suitable for use as a thermal insulation material at a hot face temperature of 800° C.

Example 5

A block of microporous thermal insulation material was made by mixing together, in the same manner as Example 2, a mixture of 60 per cent by weight of pyrogenic silica available from Cabot Corporation under Trade Mark CABOSIL M5, 33.3 per cent by weight of a particulate opacifier in the form of titanium dioxide and 6.7 per cent by weight of chopped R-glass strand available from Vetrotex International under the Trade Mark VETROTEX Rc10 4.5 mm p388 code CR98D, the filaments having a nominal length of 4.5 mm and a nominal diameter of 10 microns, the glass having substantially the following composition:

| | |
|---|---|
| SiO$_2$ | 60 percent by weight |
| Al$_2$O$_3$ | 25 percent by weight |
| MgO | 6 percent by weight |
| CaO | 9 percent by weight |

The mixture was compacted into a cylindrical block having similar dimensions to those in Example 1, the block having a density of 320 kg/m$^3$, and was heated at a temperature of 800° C. for a period of 24 hours. When the block had cooled it was established that the block had shrunk by 0.83 per cent in the diametral direction and 0.80 per cent in the axial direction. Such a material is generally suitable for use as a thermal insulation material at a hot face temperature of 800° C.

Example 6

Tests were carried out to determine the effect of filament content in the mixture. Blocks of microporous thermal insulation material were made by mixing together and compacting, generally in the same manner as Example 2, a mixture of 60 per cent by weight of pyrogenic silica available from Cabot Corporation under the Trade Mark CABOSIL M5, and 40 per cent by weight of a mixture of particulate opacifier in the form of titanium dioxide and chopped glass strand available from Vetrotex International under the Trade Mark VETROTEX, the filaments having a nominal length of 12 mm and a nominal diameter of 12 microns and a glass composition substantially the same as that in Example 3 above. Glass filaments were incorporated into the mix from which the blocks were manufactured in the proportions by weight of 5 per cent, 10 per cent, 15 per cent and 20 per cent.

The blocks were heated at a temperature of 800° C. for a period of 24 hours. When the blocks had cooled the following shrinkage figures were obtained:

TABLE 1

| Filament content | Diametral Shrinkage | Axial Shrinkage |
|---|---|---|
| 5 percent | 0.91% | 0.84% |
| 10 percent | 1.11% | 0.93% |
| 15 percent | 1.22% | 0.76% |
| 20 percent | 1.41% | 0.67% |

By way of comparison, a block containing 5 per cent by weight of FIBERFRAX filaments made and heated in the same manner was found to have a diametral shrinkage of 0.28 per cent and an axial shrinkage of 0.17 per cent.

Example 7

As described hereinabove, microporous thermal insulation material is noted for its particularly low thermal conductivity. Clearly, any new form of microporous thermal insulation should exhibit similarly low thermal conductivity. We have manufactured blocks of microporous thermal insulation material in accordance with the method outlined in Example 5, but using a pyrogenic silica available from Cabot Corporation under the Trade Mark CABOSIL MS55, in place of M5 silica, in combination with Filament Types 3, 4 and 5 from Example 4. The material was compacted to a density of 320 kg/m$^3$. We have compared the thermal conductivity of blocks containing glass filaments with the thermal conductivity of equivalent blocks containing FIBERFRAX filaments and the results are summarised in Table 2 below:

TABLE 2

| Filament content (percent by weight) | Thermal conductivity (W/ (m K)) | |
|---|---|---|
| | 200° C. mean | 400° C. mean |
| Filament Type 3 | | |
| 3.0 | 0.0254 | 0.0323 |
| 5.0 | 0.0261 | 0.0340 |
| 6.7 | 0.0279 | 0.0377 |
| Filament Type 4 | | |
| 3.0 | 0.0252 | 0.0314 |
| 5.0 | 0.0256 | 0.0319 |
| 6.7 | 0.0271 | 0.0344 |
| Filament Type 5 | | |
| 3.0 | 0.0251 | 0.0320 |
| 5.0 | 0.0258 | 0.0337 |
| 6.7 | 0.0275 | 0.0360 |
| FIBERFRAX (Comparative) | | |
| 3.0 | 0.0242 | 0.0303 |
| 5.0 | 0.0244 | 0.0304 |
| 6.7 | 0.0251 | 0.0308 |

We have also measured the thermal conductivity of flat panels of microporous thermal insulation material compacted to 240 kg/m$^3$ within a porous envelope of glass filament material using CABOSIL MS55 grade silica from Cabot Corporation, titanium dioxide and either Filament Type 4 or FIBERFRAX. The results are summarized in Table 3 below:

TABLE 3

| Filament content (percent by weight) | Thermal conductivity (W/ (m K)) | |
|---|---|---|
| | 200° C. mean | 400° C. mean |
| Filament Type 4 | | |
| 3.0 | 0.0246 | 0.0301 |
| 5.0 | 0.0250 | 0.0316 |
| 6.7 | 0.0254 | 0.0322 |
| FIBERFRAX (Comparative) | | |

TABLE 3-continued

| Filament content (percent by weight) | Thermal conductivity (W/ (m K)) | |
| --- | --- | --- |
| | 200° C. mean | 400° C. mean |
| 6.7 | 0.0240 | 0.0303 |

Thus, while the thermal conductivity of blocks of the insulation material containing Filament Types 3, 4 and 5 falls with decreasing filament content, it never quite falls to the thermal conductivity of blocks containing equivalent amounts of FIBERFRAX. On the other hand, the thermal conductivity of panels containing 3 per cent by weight of Filament Type 4 is comparable with the thermal conductivity of equivalent panels containing 6.7 per cent by weight of FIBERFRAX. We believe this is because the glass filaments in the panels are more orientated than the FIBERFRAX filaments.

Example 8

Microporous thermal insulation material, being made from compacted particulate materials, is a relatively weak and friable material. One consideration when manufacturing new forms of microporous thermal insulation material is therefore the strength of the material and the degree to which it can be handled. We have carried out tests on the flexural strength of microporous thermal insulation materials containing glass filaments.

Test Procedure

A rectangular slab of the microporous thermal insulation material is placed in a standard three-point flexural strength test rig ensuring that the slab is centralised between the three loading bars. The load is then increased until the slab fails and the maximum force in kN is noted. The flexural strength of the slab in kN/m² can be determined from the maximum force supported by the slab and the dimensions of the slab in accordance with the following equation:

$$\text{Flexural Strength} = \frac{3 \times P \times s}{2 \times a^2 \times b}$$

where:
P = maximum force (kN) supported by the panel
s = support span (m) between loading bars
a = thickness (m) of the panel
b = width (m) of the panel.

A first test was carried out on blocks made from a number of different microporous thermal insulation mixtures generally in accordance with Example 7 and based on Filament Types 4 and FIBERFRAX with the filament content of the mixture varying between 1 and 6.7 per cent by weight and the mixture compacted to average densities of 240 kg/m³ and 320 kg/m³, although it should be noted that blocks containing FIBERFRAX could not be made successfully below 2 per cent by weight of filament. The results are summarised in FIG. 1 which is a graph showing the variation in flexural strength of the blocks (measured in kN/m²) with filament content. In FIG. 1, the dashed line represents the flexural strength of material containing Filament Type 4 and compacted to a density of 320 kg/m³, the dotted line represents comparative data on the strength of material containing FIBERFRAX and compacted to a density of 320 kg/m³, the dot-dash line represents the strength of material containing Filament Type 4 and compacted to a density of 240 kg/m³ and the full line represents comparative data on the strength of material containing FIBERFRAX compacted to a density of 240 kg/m³. FIG. 1 shows that the flexural strength of microporous thermal insulation material in general increases with increasing filament content and that the flexural strength of microporous thermal insulation material containing glass filaments is, in general, superior to the flexural strength of microporous thermal insulation material containing FIBERFRAX.

Figure 2:
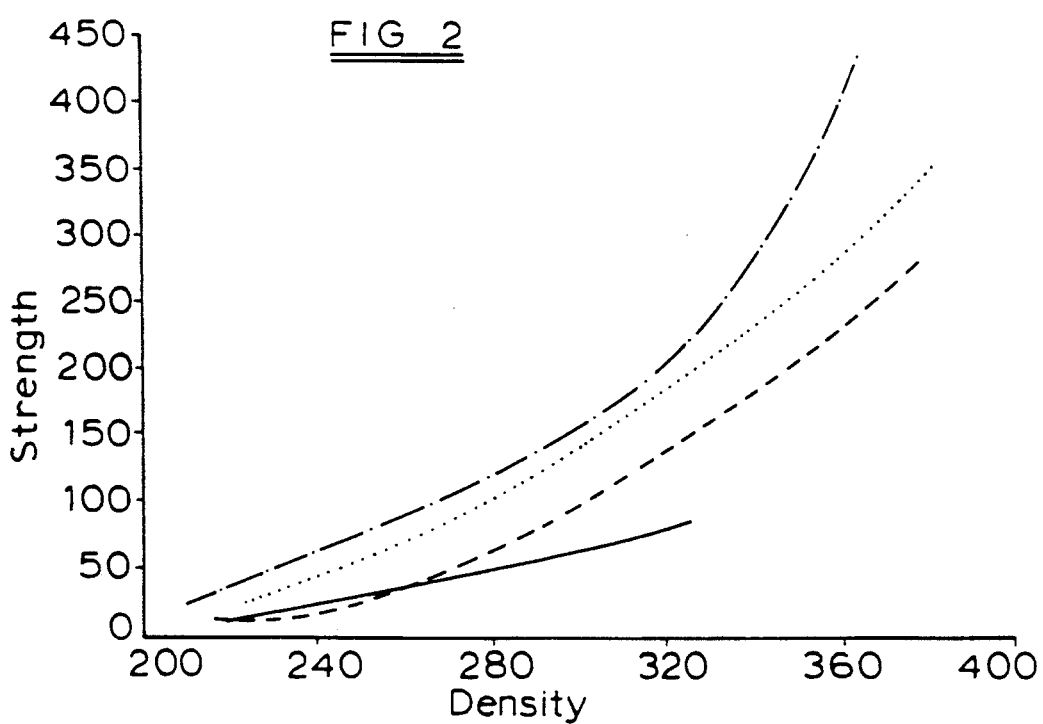
FIG. 2 is a graph illustrating the variation of the flexural strength of microporous thermal insulation material with density for different filament types.

A second test was carried out on slabs moulded from a number of different microporous thermal insulation mixtures generally in accordance with Example 6 and based on Filament Types 3, 4 and 5 and FIBERFRAX each having a filament content of 6.7 per cent by weight and the mixture compacted to densities in the range from 200 to 400 kg/m³. The results are summarised in FIG. 2 which is a graph showing the variation in flexural strength of the slabs (measured in kN/m²) with material density (measured in kg/m³). In FIG. 2, the dashed line represents the flexural strength of material containing Filament Type 3, the dotted line represents the strength of material containing Filament Type 4, the dot-dash line represents the strength of material containing Filament Type 5 and the full line represents comparative data on material containing FIBERFRAX. FIG. 2 shows not only that microporous thermal insulation material containing glass filaments generally possesses a flexural strength higher than material containing FIBERFRAX, but that the strength also depends on the type of glass filaments used. The glass filaments of Filament Type 3 have a length of 6 mm, those of Filament Type 4 have a length of 12 mm, and those of Filament Type 5 have a length of 25 mm. Thus, within the range of the tests we have carried out, it can be seen that flexural strength increases with increasing filament length.

Figure 3:
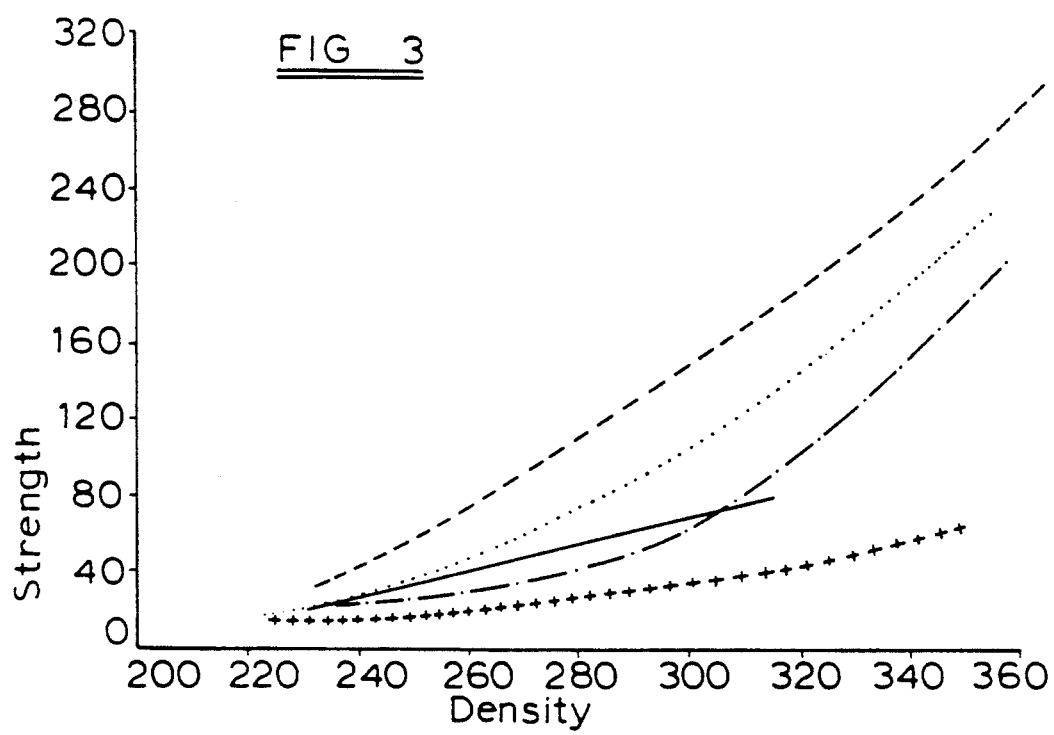
FIG. 3 is a graph illustrating the variation of the flexural strength of microporous thermal insulation material with density for different filament contents.

A third test was carried out on slabs moulded from a number of different microporous thermal insulation mixtures based solely on Filament Type 4 having filament contents of 1 per cent by weight, 3 per cent by weight, 5 per cent by weight and 6.7 per cent by weight and the mixture being compacted to densities in the range from 200 to 360 kg/m³. The results are summarised, and compared with the results of the mixture containing FIBERFRAX from the second test, in FIG. 3 which is a graph showing the variation in flexural strength of the panels (measured in kN/²) with the material density (measured in kg/m³). In FIG. 3 the dashed line represents the flexural strength of material containing 6.7 per cent by weight glass filament, the dotted line represents the strength of material containing 5 per cent by weight glass filament, the dot-dash line represents the strength of material containing 3 per cent by weight glass filament, the line of "+" characters represents the strength of material containing only 1 per cent by weight of glass filament, and the full line represents the strength of material containing 6.7 per cent by weight of FIBERFRAX. FIG. 3 shows that the flexural strength of microporous thermal insulation material increases with an increasing proportion of glass filaments, but more significantly shows that the strength of microporous thermal insulation material containing glass filaments is considerably stronger than material containing a similar proportion of FIBERFRAX.

The microporous thermal insulation material according to the present invention can be used, for example, in the manufacture of panels enclosed within confining envelopes and in the manufacture of moulded shapes. The material is resistant to shrinkage up to at least 800° C., and possibly higher, and chopped glass strand, in contrast to ceramic filaments, is not respirable. One specific use of the microporous thermal insulation material according to the present invention will now be described with reference to FIGS. 4 and 5.

Figure 4:
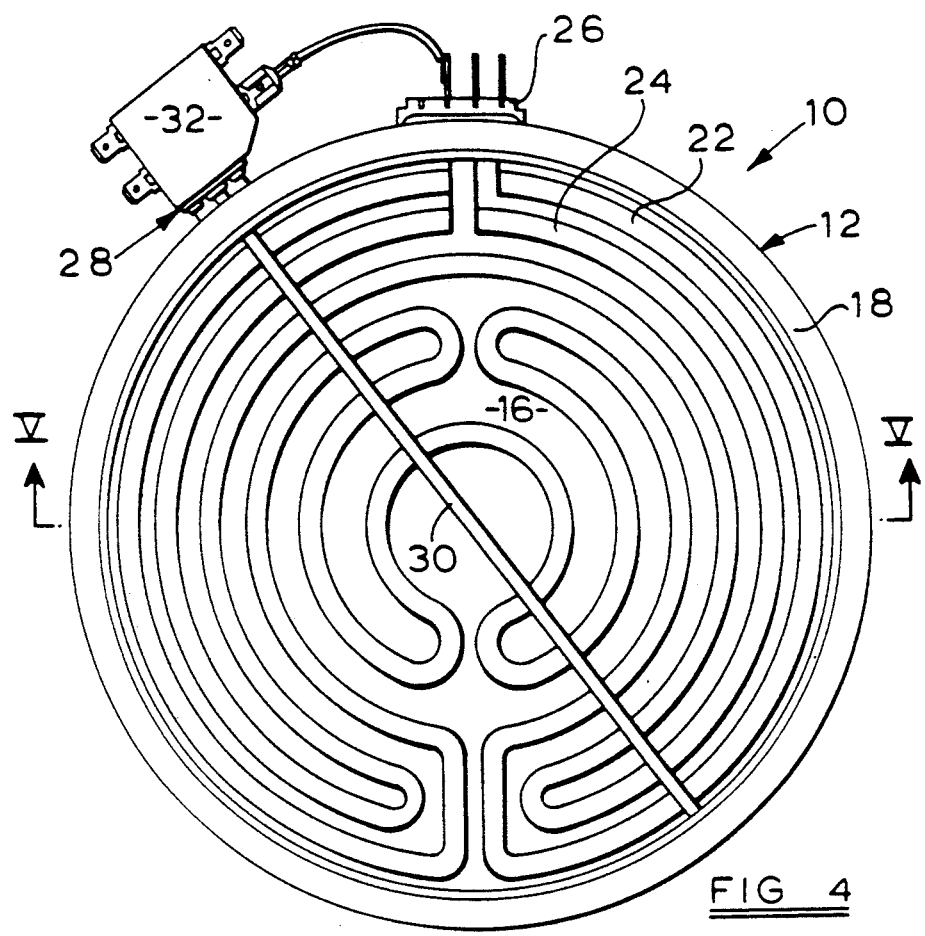
FIG. 4 is a plan view of a radiant heater incorporating a peripheral wall made of microporous thermal insulation material according to the present invention.
Figure 5:
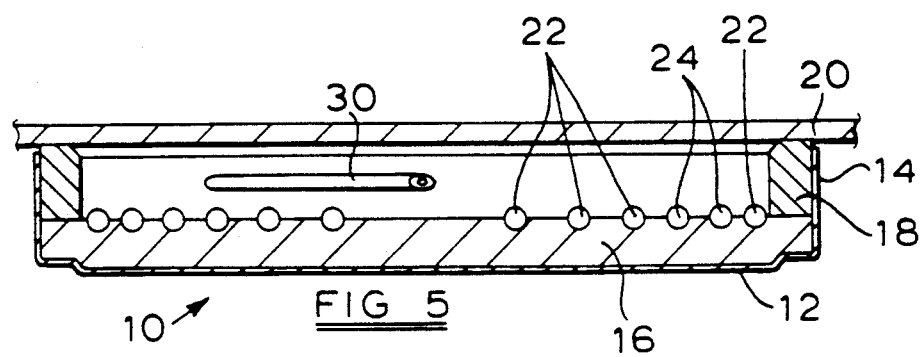
FIG. 5 is a cross-sectional view taken along the line V—V in FIG. 4.

The radiant electric heater 10 shown in FIGS. 4 and 5 comprises a container in the form of a metal dish 12 with an upstanding rim 14 and containing a layer of electrical and thermal insulating material 16, such as a microporous thermal insulation material. A ring-shaped insulating wall 18 of microporous thermal insulation according to the present invention extends around the inside of the rim 14 of the dish 12, on top of the layer 16 and protruding slightly above the edge of the rim 14. When installed in a glass ceramic top cooker the wall 18 is pressed against the underside of a glass ceramic cooking surface 20, the heater 10 being held in position by a spring or other mounting device (not shown).

The layer 16 supports two coiled bare resistance-wire heating elements 22 and 24 arranged in multiple concentric, generally circular portions within and adjacent the wall 18. The coiled elements 22 and 24 are secured to the layer 16 by, for example, staples held by friction in the insulating material of the layer 16, or by gluing to the layer 16 or to stakes inserted therein. The ends of the heating elements 22 and 24 are coupled to respective conductors in an electrical conductor block 26 mounted at the edge of the dish 12.

As is customary with radiant heaters for glass ceramic top cookers, a temperature sensitive rod limiter 28 is provided with its probe 30 extending across the heater 10. This probe typically comprises a fused silica tube containing a metal rod, which is preferably plated with a reflective material, such as silver, as described in United Kingdom Patent Specification No. 2,146,431A. A snap-action switch 32 controlled by the probe 30 is provided for connection in series with the heating elements 22 and 24, to prevent heating of the cooktop 20 above its maximum safe temperature. The limiter switch 32 is connected to the ends of the two heating elements 22 and 24.

Clearly the configuration of the heater can be varied. For example the overall shape of the heater can be changed as can the number and type of heating elements, possibly to include infra-red lamps. The important aspect of the radiant heater shown in FIGS. 4 and 5 is that the wall 18 is made of microporous thermal insulation material according to the present invention. It is usual to make the wall 18 from a tube made by vacuum forming ceramic filament material which is hardened with the aid of a binder such as silica sol and an organic starch. However, cutting the tube into individual rings and trimming the rings to fit the heater 10 gives rise to considerable quantities of dust which is undesirable, and the organic starch requires to be burnt out in order to avoid smoke and smell from the first use of the heater. Moreover, such rings are generally too weak to use without re-hardening with silica sol. The problem has always been to find an alternative inorganic insulating material for the peripheral wall 18 that is not only free from dust, but which also has sufficient mechanical strength to withstand the stresses incurred during manufacture of the heater and subsequent assembly of the heater into a cooking appliance.

Figure 6:
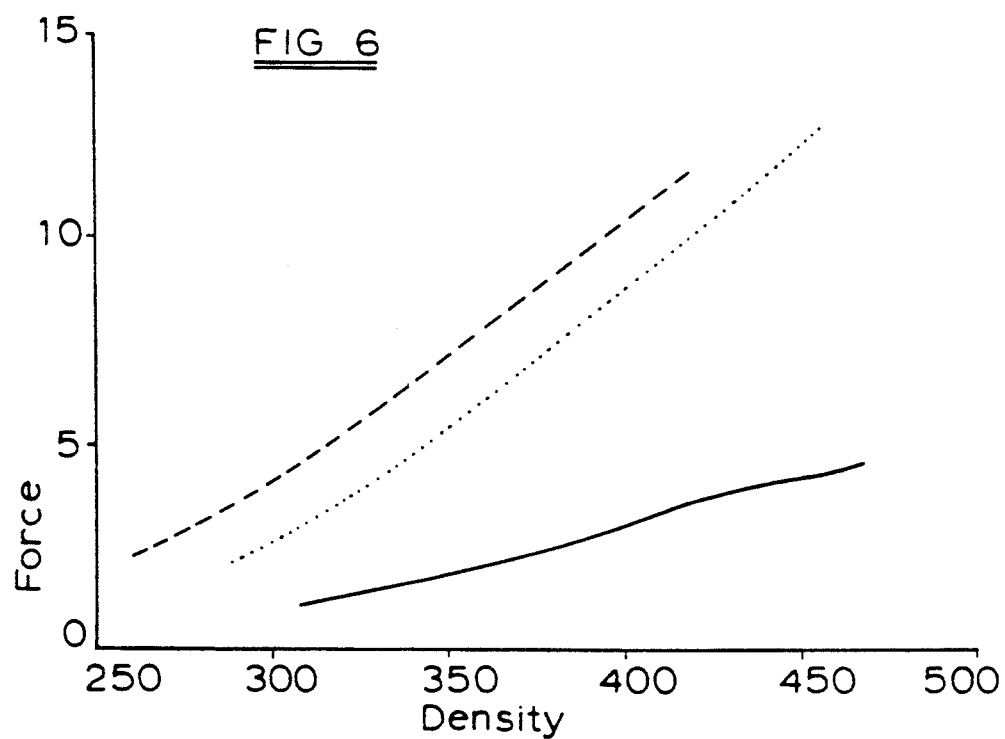
FIG. 6 is a graph illustrating the variation of the strength of rings of microporous thermal insulation material with density for different mixtures.

Depending on its configuration and any additional hardening treatment a peripheral wall 18 will withstand a diametral force of some 4 to 11N before failure. We have tested a conventional microporous thermal insulation material comprising 60 per cent by weight of CABOSIL M5 grade silica, 28.5 per cent by weight of titanium dioxide and 11.5 per cent by weight of aluminosilicate filaments in the form of FIBERFRAX by moulding the microporous thermal insulation material into rings at a range of densities from 310 to 460 kg/m$^3$. Only at densities of nearly 450 kg/m$^3$ did the rings withstand a force in excess of 4N. We have also tested microporous thermal insulation material containing glass filaments according to the present invention by moulding the microporous thermal insulation material into rings. A first mixture comprised 60 per cent by weight of CABOSIL M5 grade silica, 30 per cent by weight of titanium dioxide and 10 per cent by weight of Filament Type 3, and a second mixture comprised 60 per cent by weight of CABOSIL M5 grade silica, 25 per cent by weight of titanium dioxide and 15 per cent by weight of Filament Type 3. The results are summarised in FIG. 6 in which the mixture containing 15 per cent by weight of Filament Type 3 is shown as a dashed line, the mixture containing 10 per cent by weight of Filament Type 3 is shown as a dotted line, and the mixture containing 11.5 per cent by weight of FIBERFRAX is shown as a full line. As can be seen from FIG. 6, the mixture with 15 per cent by weight of glass filaments withstands a force of 4N at a density of less than 300 kg/m$^3$ and a force of 11N at a density of about 410 kg/m$^3$, while even the mixture with 10 per cent by weight of glass filaments withstands a force of 4N at a density of about 330 kg/m$^3$ and a force of 11N at a density of less than 440 kg/m$^3$.

We believe this clearly demonstrates the considerable strength advantages of the microporous thermal insulation material according to the present invention, which advantages are coupled with the unexpected resistance of the material to shrinkage at temperatures even up to 800° C.

We claim:

1. A thermal insulation material comprising an intimate, dry mixture of a particulate microporous material and reinforcing glass filaments, wherein the glass constituting the glass filaments contains not more than 1 per cent by weight Na$_2$O.

2. A thermal insulation material according to claim 1, wherein the glass has the following composition:

| | |
|---|---|
| SiO$_2$ | 50-100 percent by weight |
| Al$_2$O$_3$ | up to 25 percent by weight |
| B$_2$O$_3$ | up to 8 percent by weight |
| MgO | up to 10 percent by weight |
| CaO | up to 21 percent by weight |
| Na$_2$O | up to 1 percent by weight |
| K$_2$O | up to 2 percent by weight |
| Fe$_2$O$_3$ | up to 1 percent by weight |
| F$_2$ | up to 1 percent by weight. |

3. A thermal insulation material according to claim 2, wherein the glass has substantially the following compositions:

| | |
|---|---|
| SiO$_2$ | 54 to 55 percent by weight |
| Al$_2$O$_3$ | 14 to 15 percent by weight |
| B$_2$O$_3$ | 7 to 8 percent by weight |
| MgO | 0.3 to 3 percent by weight |
| CaO | 18 to 21 percent by weight |
| Na$_2$O | up to 0.6 percent by weight |
| K$_2$O | up to 0.2 percent by weight |

-continued

| | |
|---|---|
| Fe$_2$O$_3$ | 0.2 to 0.4 percent by weight |
| F$_2$ | up to 1 percent by weight. |

4. A thermal insulation material according to claim 2, wherein the glass has substantially the following compositions:

| | |
|---|---|
| SiO$_2$ | 60 percent by weight |
| Al$_2$O$_3$ | 25 percent by weight |
| MgO | 6 percent by weight |
| CaO | 9 percent by weight |

5. A thermal insulation material according to claim 1, wherein the glass filaments are chopped from continuous glass filaments.

6. A thermal insulation according to claim 1, wherein the glass filaments have a length from 4 to 50 mm.

7. A thermal insulation material according to claim 6, wherein the glass filaments have a length from 6 to 25 mm.

8. A thermal insulation material according to claim 1, wherein the glass filaments have a diameter in the range from 3 to 20 microns.

9. A thermal insulation material according to claim 8, wherein the glass filaments have a diameter in the range from 6 to 15 microns.

10. A thermal insulation material according to claim 1, wherein the insulation material contains from 1 to 20 per cent by weight of glass filaments.

11. A thermal insulation material according to claim 10, wherein the insulation material contains from 3 to 15 per cent by weight of glass filaments.

12. An insulation member formed from a dry thermal insulation material comprising an intimate mixture of a particulate microporous material and reinforcing glass filaments, wherein the glass constituting the glass filaments contains not more than 1 percent by weight Na$_2$O.

13. An insulation member according to claim 12, wherein the glass has the following composition:

| | |
|---|---|
| SiO$_2$ | 50–100 percent by weight |
| Al$_2$O$_3$ | up to 25 percent by weight |
| B$_2$O$_3$ | up to 8 percent by weight |
| MgO | up to 10 percent by weight |
| CaO | up to 21 percent by weight |

-continued

| | |
|---|---|
| Na$_2$O | up to 1 percent by weight |
| K$_2$O | up to 2 percent by weight |
| Fe$_2$O$_3$ | up to 1 percent by weight |
| F$_2$ | up to 1 percent by weight. |

14. An insulation member according to claim 13, wherein the glass has substantially the following composition:

| | |
|---|---|
| SiO$_2$ | 54 to 55 percent by weight |
| Al$_2$O$_3$ | 14 to 15 percent by weight |
| B$_2$O$_3$ | 7 to 8 percent by weight |
| MgO | 0.3 to 3 percent by weight |
| CaO | 18 to 21 percent by weight |
| Na$_2$O | up to 0.6 percent by weight |
| K$_2$O | up to 0.2 percent by weight |
| Fe$_2$O$_3$ | 0.2 to 0.4 percent by weight |
| F$_2$ | up to 1 percent by weight. |

15. An insulation member according to claim 13, wherein the glass has substantially the following composition:

| | |
|---|---|
| SiO$_2$ | 60 percent by weight |
| Al$_2$O$_3$ | 25 percent by weight |
| MgO | 6 percent by weight |
| CaO | 9 percent by weight |

16. An insulation member according to claim 12, wherein the glass filaments are chopped from continuous glass filaments.

17. An insulation member according to claim 12, wherein the glass filaments have a length from 4 to 50 mm.

18. An insulation member according to claim 17, wherein the glass filaments have a length from 6 to 25 mm.

19. An insulation member according to claim 12, wherein the glass filaments have a diameter in the range from 3 to 20 microns.

20. An insulation member according to claim 19, wherein the glass filaments have a diameter in the range from 6 to 15 microns.

21. An insulation member according to claim 12, wherein the insulation material contains from 1 to 20 percent by weight of glass filaments.

22. An insulation member according to claim 21, wherein the insulation material contains from 3 to 15 percent by weight of glass filaments.

* * * * *